Dec. 14, 1948.  R. D. ACTON  2,456,236
HYDRAULIC CYLINDER AND PISTON DEVICE
Filed June 20, 1947  2 Sheets-Sheet 1
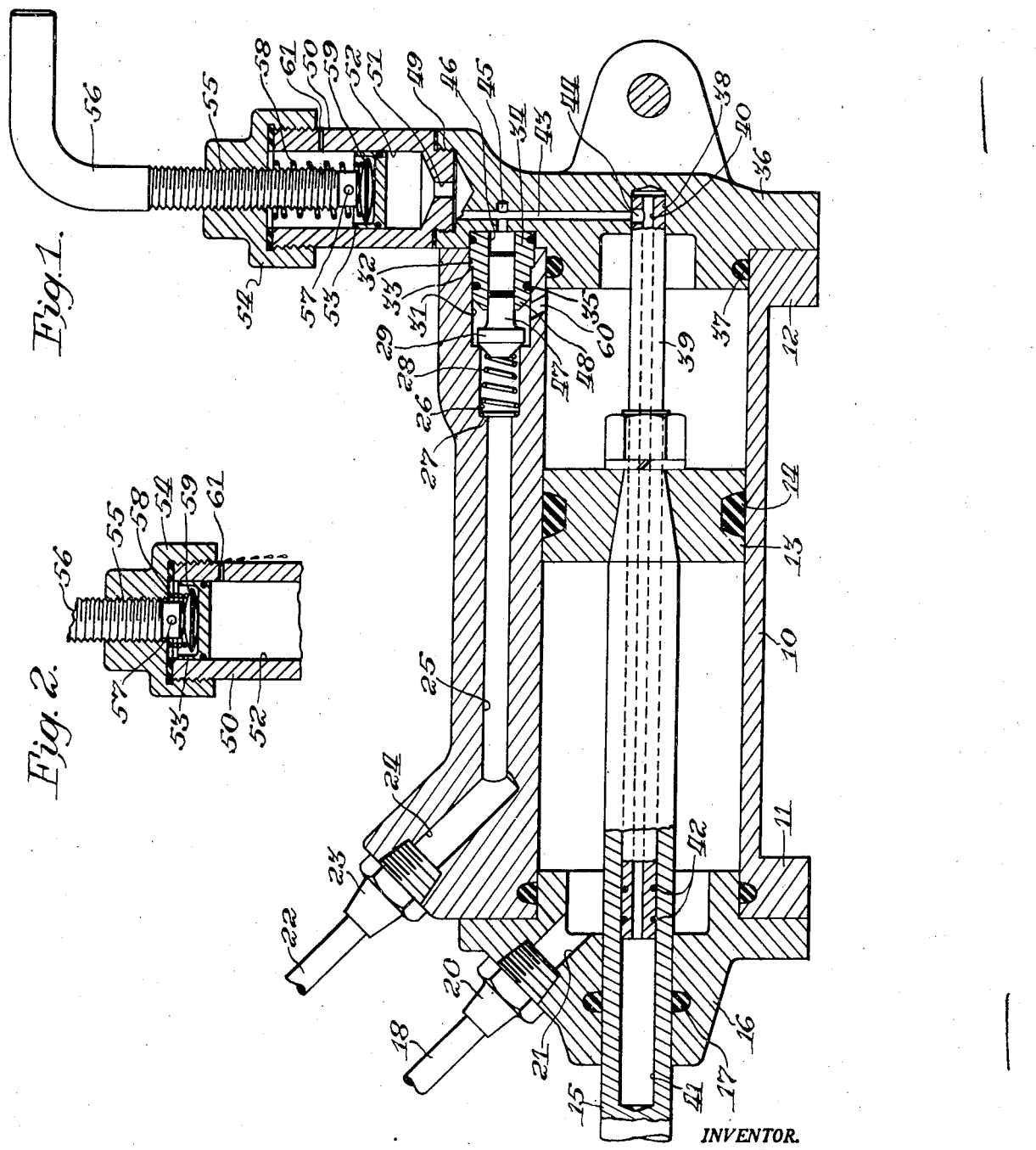
INVENTOR.
Russel D. Acton
BY
Paul O. Pippel
Atty.

Dec. 14, 1948. R. D. ACTON 2,456,236
HYDRAULIC CYLINDER AND PISTON DEVICE
Filed June 20, 1947 2 Sheets-Sheet 2
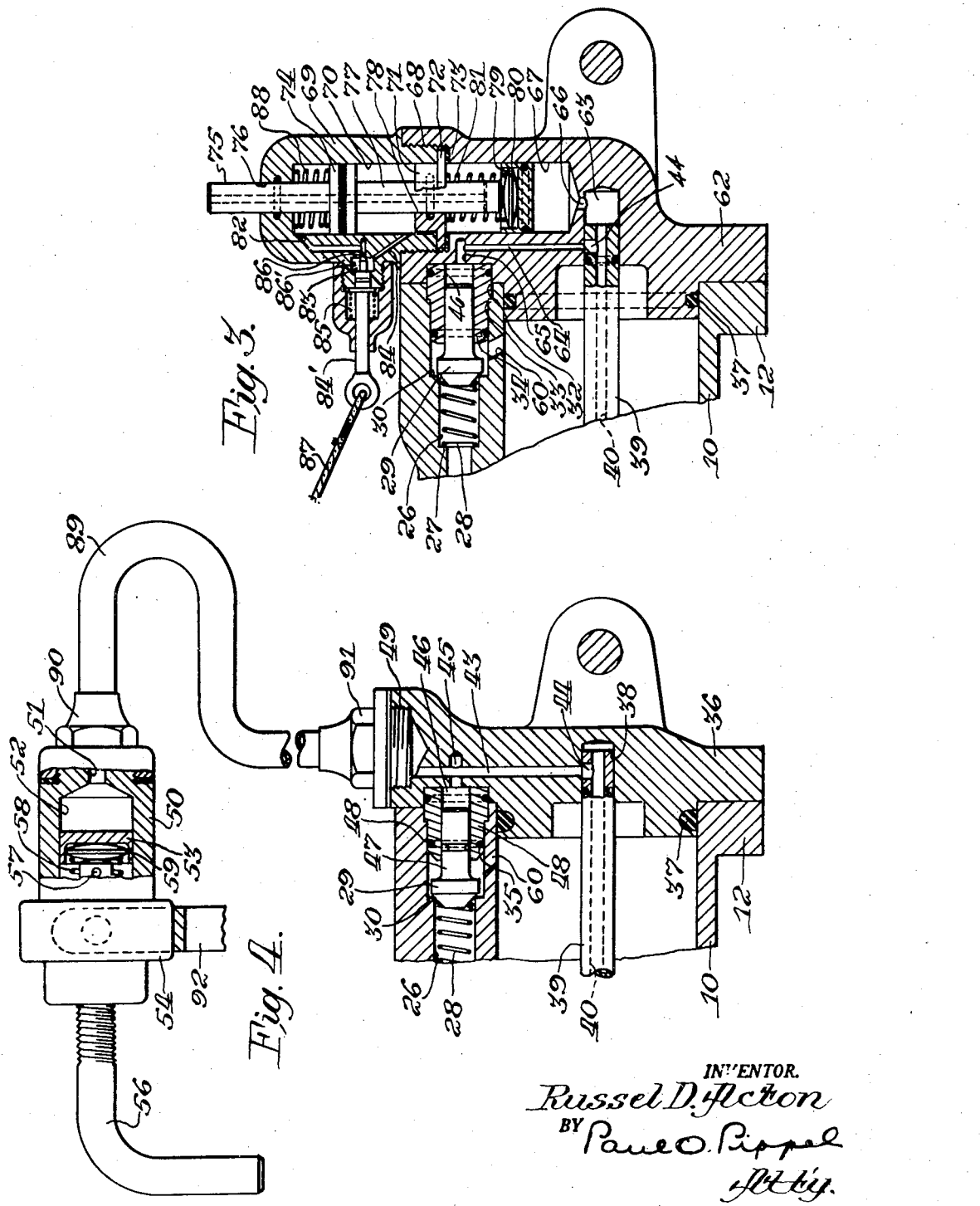
INVENTOR.
Russel D. Acton
BY Paul O. Pippel
Atty.

Patented Dec. 14, 1948

2,456,236

UNITED STATES PATENT OFFICE 2,456,236

HYDRAULIC CYLINDER AND PISTON DEVICE

Russel D. Acton, Chicago, Ill.

Application June 20, 1947, Serial No. 755,993

9 Claims. (Cl. 121—38)

1

This invention relates to a hydraulic cylinder and piston device. More specifically, it relates to an adjustable hydraulically actuated stop device for a cylinder and piston construction.

In the use of hydraulically actuated cylinder and piston devices it is often desirable to provide a stop at some predetermined point in the movement of the piston. It is also essential that such a stop be adjustable so that it may be manually pre-set at a desired location. Various types of mechanical stop arrangements have been provided to limit the movement of a piston and thereby provide predetermined stop means. Valve devices have also been utilized using relative movement of the cylinder and piston to operate a valve controlling flow of fluid to or from the cylinder.

A principal object of the invention is to provide a hydraulically actuated blocking valve for a cylinder and piston device which is operated by means entirely incorporated within the cylinder and piston construction so that there are no exposed moving parts.

Another principal object is to provide a rephasing means for a hydraulically actuated stop device whereby it can readily be reset at the extreme limit of its actuation in one direction.

A subsidiary object is to provide a piston means within the piston rod of a reciprocating piston to produce fluid displacement for actuating a blocking valve in a hydraulic device.

The above objects and others which will be apparent from the detailed description to follow are accomplished by a construction such as shown in the drawings.

Figure 1 is a cross section through a cylinder and piston device incorporating the hydraulically actuated stop means of the invention.

Figure 2 is a section of a portion of the device showing the manual adjusting means in a position to permit rephasing of the secondary hydraulic circuit.

Figure 3 is a section corresponding to the right end of Figure 1 showing a modification rephasing for remote control of the hydraulically actuated stop means by a tension element.

Figure 4 is a section corresponding to the right end of Figure 1 with the manually actuated abutment means for the displacement piston being connected to the main cylinder by a flexible conduit.

In the drawings, a conventional cylinder 10 having flanged end portions 11 and 12 carries a piston 13 mounted for reciprocation therein. A

2 resilient packing and sealing means 14 is illustrated as being a part of the piston 13.

A piston rod 15 slidably extends through a flanged member 16 which is secured by suitable means to one of the flanged ends 11 of the cylinder 10. The member 16 is provided with a packing and sealing means 17 which engages the piston rod 15. A flexible conduit 18 is connected to a fitting 20 threaded into the member 17 in alignment with a conduit 21 formed therein and communicating with the cylinder 10 at one end.

A flexible conduit 22 is secured by a fitting 23 threaded in the cylinder 10 and communicating with a bore 24 formed therein. Said bore communicates with a longitudinal bore 25 which in turn communicates with a relatively larger bore 26. A shoulder 27 formed at the junction of the bores 25 and 26 provides a seat for a spring 28 which abuts a conical valve 29. The valve 29 seats on a shoulder 30 formed at the junction of the bore 26 and a bore 31 of larger diameter. The bore 31 communicates with a bore 32 of larger diameter thereby forming a shoulder 33 against which an offset portion of a fitting 34 is seated. Said fitting closely engages the bores 32 and 31 and is provided with a sealing ring 35 abutting the bore 31.

An attaching and head member 36 is fitted at the end of the cylinder 10 opposite the member 16 and is adapted to be secured by suitable means to the flange 12 and sealed by a resilient ring 37. The member 36 is provided with a bore 38 concentric with the piston rod. A rod 39 having a bore 40 therein for its entire length is fitted in the bore 38 and slidably extends through a bore 41 formed in the piston 15. Sealing rings 42 provide a fluid seal between the rod 39 and the piston 15. A bore 43 formed in the member 36 communicates with the bore 40 in the rod 39 through a radial opening 44 formed in said rod. The bore 43 communicates through a bore 45 with a bore 46 formed in the member 34. The blocking valve 29 is provided with a stem 47 slidably mounted in the bore 46, a sealing ring 48 being provided to prevent the escape of fluid under pressure past said stem.

The bore 43 also communicates with a threaded bore 49. A cylindrical member 50 is threaded into the bore 49 in a fluid type manner. Said member is provided with a bore 51 communicating through the bore 49 with the bore 43 and with an enlarged cylinder bore 52, said bore extending to the upper end of the member 51 to provide for the insertion of a displacement piston 53. Said piston is fitted in a fluid type manner in the bore 52. A cap-like fitting 54 threaded on the upper end of the member 50 is provided with an internally threaded bore 55 through which a manually actuated adjusting member 56 is threaded. Said member is provided with a pin 57 at its lower end to limit its travel in an upward direction as illustrated in Figure 2. A compression spring 58 surrounding the threaded member 56 within the bore 52 abuts a resilient spring means consisting of oppositely facing concave resilient members 59. Said members are generally of the type referred to as Belleville washers. The lowermost of said members abuts the interior surface of the displacement piston 53.

In the operation of the device shown in Figures 1 and 2 it will be assumed that fluid under pressure is delivered through the conduit 18 into the cylinder at the left side of the piston 13. The piston will then move to the right with the bore 41 telescoping over the rod 39 and thereby forcing fluid in the bore 41 through the bore 40 and the bore 43 into the bore 46 and into bore 52 of the auxiliary cylinder member 15 having the displacement piston 53 therein. As the piston is relatively light compared to the spring 28, the displacement piston 53 will move with movement of the piston 13 until it reaches the position shown in Figure 1 with the members 59 abutting the end of the adjusting member 56. Pressure will then rise in the auxiliary or secondary hydraulic circuit, thereby increasing pressure against the valve stem 47. In comparing the action of the displacement piston 53 with movement of the valve 29, it will be noted in addition to the difference in the strength of the springs 28 and 58 that the cross sectional area of the piston stem 47 is much less than the cross sectional area of the displacement piston 53, resulting in movement of the displacement piston up against its stop means before any movement of the blocking valve 29.

It will also be noted that the cross sectional area of the bore 41 is much less than the cross sectional area of the bore 52, whereby the length of the stroke of the displacement piston 53 is very much less than the length of the stroke of the piston 13.

When the displacement piston 53 has abutted its stop means, the valve 29 will be moved into the position shown in Figure 1. This completely blocks the exit of liquid from the cylinder at the right side of the piston, the fluid normally flowing through a port 60 communicating between the cylinder and the bore 31.

By adjusting the member 56 it will be understood that any stop position can be provided for the displacement piston 53 throughout its entire length, and that correspondingly any stop position may be selected for the main work piston 33.

The auxiliary fluid system which actuates the displacement piston 53 is normally under very little pressure and should never reach a pressure in excess of that required to operate the valve 29 against the spring 28. However, to provide for a momentary sticking of the valve 29 or for other reasons which might prevent immediate seating of said valve the members 59 have been provided to permit the displacement piston 53 to overrun its stroke a considerable distance by compressing the wafer-like resilient members 59.

As the pressure in the secondary or auxiliary hydraulic system is usually very much less than the pressure developed in the main hydraulic system, there will be a tendency for fluid to leak past the valve seals, particularly the sealing rings 42, into the secondary system. This leakage will mean that the device will block the movement of the piston at an earlier point than initially determined by the setting of the adjusting member 56. This can be taken care of by readjusting the member 56 until a situation is reached where no more adjustment can be accommodated with the adjusting member reaching the position shown in Figure 2. However, as soon as the displacement piston 53 reaches a position in its travel beyond the small orifice 61 the excess fluid is forced out the secondary circuit with the piston 13 completing its stroke to the end of the cylinder 10. This completely rephases the secondary circuit and permits adjustment of the stop 56 until leakage again occurs in an excessive amount. It may be desirable to adjust the displacement piston to the position shown in Figure 2 periodically to rephase the secondary system.

Figure 3 shows a modification having the same main cylinder and piston parts shown in Figure 1, which parts are identified by the same reference characters. In the construction of Figure 3 an end member 62 secured to the flanged ends 12 of the cylinder 10 is provided with a bore 63 in which the rod 39 is fitted. The bore 44 in the rod 39 communicates with a bore 64 which communicates with a bore 65 communicating with the bore 46 as described in connection with the structure shown in Figure 1. The bore 63 communicates by means of a port 66 with a cylindrical bore 67 which terminates in a threaded bore 68 of larger diameter. An inverted cup-like member 69 provided with a cylindrical bore 70 in alignment with the bore 67 is rotated into the bore 68 in a fluid-like manner. A member 71 having a portion fitted in the bore 70 is provided with a flange 72 secured between the adjacent ends of the member 69 and a shoulder 73 provided by the differential diameters of the bores 67 and 68. A piston 74 mounted for reciprocation in the bore 70 has an upwardly extending stem or piston rod 75 slidably extending through a bore 76 formed in the member 69. Said stem serves as an indicator so that the position of the piston 74 may be determined. The piston 74 is also provided with a downwardly extending stem or piston rod 77 which slidably extends through a bore 78 formed in the member 71. At its lower end the stem 77 abuts a resilient structure in the form of abutting dished resilient elements 79 mounted in a displacement piston 80. The displacement piston is mounted for reciprocation in the bore 67. A compression spring 81 abutting the member 71 and the upper element 79 provides means to cause said displacement cylinder to maintain liquid in the secondary system under a slight pressure.

Fluid communicating means including a bore 82, a chamber 83, and a bore 84 connect the bore 70 adjacent its ends to provide for the transfer of fluid between opposite sides of the piston 74. A valve member 84' resiliently held in closed position by a spring 85 is provided with a needle valve 86 which fits in the compartment 86' at the communicating end of the bore 83, thereby normally preventing the flow of fluid between one end of the bore 70 and the other. A flexible means 87 is illustrated for withdrawing the needle valve 86 from a remote position to permit movement of the piston 74 and to thereby permit adjustment of the stop provided by the stem 77 of said piston.

The modification as described in Figure 3 functions in exactly the same manner as the construction shown in Figure 1, the difference being that the stop position of the displacement piston 80 is determined by a third hydraulic system which can be readily operated from a remote point by the valve member 84'. A spring 88 abutting the inside surface of the member 69 and the upper side of the piston 74 causes said piston to follow the displacement piston whenever the needle valve 86 is withdrawn. As soon as said valve is allowed to seat by release of the tension on the valve member 84' the piston 74 provides an adjustable stop through its stem 77 to determine exactly the movement of the displacement piston 80. When said piston is stopped pressure builds up in the bore 45, thereby moving the valve into blocking position.

The modification shown in Figure 4 is identical with the construction shown in Figure 1 and bears the same reference characters to identify corresponding parts The modification of Figure 4 indicates an added element in the form of a flexible conduit 89 secured to fittings 90 and 91. The fitting 91 is threaded into the bore 49 and the fitting 90 is threaded onto the threaded extension formed on the cylindrical member 50. By means of the flexible conduit the adjusting member 56 and the associated parts may be located remotely from the cylinder and secured at any position available to an operator by means of a bracket 92. Such a construction is particularly desirable when the cylinder is located at a remote point more readily accessible to an operator, and where frequent adjustment of the effective position of the blocking valve is necessary.

Although applicant has shown only preferred embodiments of his improved hydraulically adjustable stop means for cylinder and piston devices, it is to be understood that all modifications falling within the scope of the appended claims are contemplated as parts of the invention.

What is claimed is:

1. A stop mechanism for an expansible fluid-pressure operated device comprising in combination with a cylinder and a piston mounted for reciprocation therein, a piston rod connected to the piston and extending through one end of the cylinder, a conduit for supplying fluid under pressure to said end of the cylinder, a fluid conduit communicating with the other end of the cylinder, valve means positioned to control fluid flow through said conduit, resilient means for urging said valve means to open position, a plunger chamber, a plunger mounted in said chamber engageable with the valve means and operable under fluid pressure against the plunger to overcome the resilient means and to seat the valve thereby blocking the conduit against the flow of liquid, a bore formed in the piston rod, a displacer piston secured to the cylinder and extending into said bore, conduit means formed in the piston, an auxiliary displacement cylinder, an auxiliary piston mounted therein, communicating fluid conduits connecting said cylinder to the plunger chamber and the conduit means in the displacer piston, stop means against which said auxiliary piston abuts at a predetermined point in its stroke as fluid is delivered from the piston rod bore to the auxiliary cylinder whereby pressure is built up to operate on the valve operating plunger and to close the valve means, and means to manually adjust the position of said abutment.

2. A device as set forth in claim 1 in which a relatively strong resilient means is provided between the auxiliary piston and the abutment means, said resilient means requiring a greater pressure to compress than the resilient means acting on the valve means.

3. A device as set forth in claim 1 in which the auxiliary displacement cylinder is connected by a flexible conduit to the communicating conduits with the valve plunger chamber and the piston rod bore whereby said auxiliary cylinder and the manual adjusting means may be located at a remote point and whereby relative motion may take place between the auxiliary cylinder and the main cylinder of the device.

4. A device as set forth in claim 1 in which the abutment is carried by a two-way hydraulic piston device and in which manually-operated valve means are provided to optionally provide communication between opposite sides of the piston for adjusting the position thereof.

5. A stop mechanism for an expansible fluid-pressure operated device comprising in combination with a cylinder and a piston, mounted for reciprocation therein, a piston rod connected to the piston and extending through one end of the cylinder, a conduit for supplying fluid under pressure to said end of the cylinder, a fluid conduit communicating with the other end of the cylinder, valve means positioned to control fluid flow through said conduit, resilient means for urging said valve means to open position, a plunger chamber, a plunger mounted in said chamber engageable with the valve means and operable under fluid pressure against the plunger to overcome the resilient means and to seat the valve thereby blocking the conduit against the flow of liquid, a bore formed in the piston rod, a displacer piston secured to the cylinder and extending into said bore, conduit means formed in the piston, an auxiliary displacement cylinder, an auxiliary piston mounted therein, communicating fluid conduits connecting said cylinder to the plunger chamber and the conduit means in the displacer piston, spring means for normally urging the auxiliary piston to maintain pressure in said communicating conduits, said spring means being of a strength to exert less force on the valve means through the liquid in said communicating conduits than the resilient means urging the valve means to open position, stop means against which said auxiliary piston abuts as fluid is delivered from the piston rod bore to the auxiliary cylinder whereby pressure is built up to operate on the valve actuating plunger and to close the valve means, and means to manually adjust the position of said abutment.

6. A device as set forth in claim 5 in which a relatively strong resilient means is provided between the auxiliary piston and the abutment means, said resilient means requiring a greater pressure to compress than the resilient means acting on the valve means.

7. A device as set forth in claim 5 in which the auxiliary displacement cylinder is connected by a flexible conduit to the communicating conduits with the valve plunger chamber and the piston rod bore whereby said auxiliary cylinder and the manual adjusting means may be located at a remote point and whereby relative motion may take place between the auxiliary cylinder and the main cylinder of the device.

8. A device as set forth in claim 5 in which the abutment is carried by a two-way hydraulic piston device and in which manually-operated valve means are provided to optionally provide communication between opposite sides of the piston for adjusting the position thereof.

9. A stop mechanism for an expansible fluid-pressure operated device comprising in combination with a cylinder and a piston mounted for reciprocation therein, a piston rod connected to the piston and extending through one end of the cylinder, a conduit for supplying fluid under pressure to said end of the cylinder, a fluid conduit communicating with the other end of the cylinder, valve means positioned to control said conduit, resilient means for urging said valve means to open position, a plunger chamber, a plunger mounted in said chamber engageable with the valve means and operable under pressure to overcome the resilient means and to seat the valve thereby blocking the conduit against the flow of liquid, a bore formed in the piston rod, a displacer piston secured to the cylinder and extending into said bore, conduit means formed in the piston, an auxiliary displacement cylinder, an auxiliary piston mounted therein, fluid conduits connecting said cylinder to the plunger chamber and the conduit means in the displacer piston, stop means against which said auxiliary piston abuts as fluid is delivered from the piston rod bore to the auxiliary cylinder whereby pressure is built up to operate on the valve plunger and to close the valve means, and means to manually adjust the position of said abutment, said stop means including a third cylinder, a piston mounted in the cylinder piston rods extending from the piston through each end of the cylinder, one rod being visible thereby serving as an indicator of the piston position, the other piston being located to provide a stop means for the auxiliary piston, a fluid conduit connecting portions of the third cylinder on opposite side of the piston, a spring pressed valve position to block fluid flow through the conduit and tension means connected to said valve and separable from a remote point to provide for adjusting the position of the piston in said third cylinder.

RUSSEL D. ACTON.

No references cited.